(12) United States Patent
Steinborn et al.

(10) Patent No.: US 8,005,337 B2
(45) Date of Patent: Aug. 23, 2011

(54) METHOD AND APPARATUS FOR PERFORMING SYNCHRONISED AUDIO AND VIDEO PRESENTATION

(75) Inventors: Peter Steinborn, Lehrte (DE); Mario Sieck, Isernhagen NB (DE)

(73) Assignee: Thomson Licensing, Boulogne-Billancourt (FR)

( * ) Notice: Subject to any disclaimer, the term of this patent is extended or adjusted under 35 U.S.C. 154(b) by 1073 days.

(21) Appl. No.: 10/584,637

(22) PCT Filed: Nov. 22, 2004

(86) PCT No.: PCT/EP2004/013243
§ 371 (c)(1),
(2), (4) Date: Jun. 26, 2006

(87) PCT Pub. No.: WO2005/069635
PCT Pub. Date: Jul. 28, 2005

(65) Prior Publication Data
US 2007/0162952 A1    Jul. 12, 2007

(30) Foreign Application Priority Data
Jan. 6, 2004    (EP) ................................... 04090001

(51) Int. Cl.
*H04N 7/087*    (2006.01)
(52) U.S. Cl. .............. 386/84; 386/85; 386/65; 386/104; 386/96
(58) Field of Classification Search ............ 386/84, 386/85, 65, 104, 96
See application file for complete search history.

(56) References Cited

U.S. PATENT DOCUMENTS

| | | | |
|---|---|---|---|
| 6,134,585 A * | 10/2000 | Yamato | 725/93 |
| 6,236,694 B1 | 5/2001 | Blatter et al. | |
| 2002/0118679 A1 * | 8/2002 | Eyer | 370/389 |
| 2002/0141452 A1 | 10/2002 | Mauritz et al. | |
| 2003/0131047 A1 * | 7/2003 | Takeyoshi et al. | 709/202 |

(Continued)

FOREIGN PATENT DOCUMENTS

DE    10146887    4/2003

(Continued)

OTHER PUBLICATIONS

P.V. Rangan et al: "Continuity and Synchronization in MPEG", IEEE Journal on Selected Areas in Communications, IEEE Inc. New York US, vol. 14, No. 1, 1996, pp. 52-60.

(Continued)

*Primary Examiner* — Thai Tran
*Assistant Examiner* — Helen Shibru
(74) *Attorney, Agent, or Firm* — Robert D. Shedd; Paul P. Kiel; Guy H. Eriksen

(57) ABSTRACT

A synchronisation of the presentation or reproduction of video data with audio data is described, which data each are processed on two non-synchronised computers. An MPEG-type stream is separated into video data and audio data, wherein the video data is processed utilising the first processing means and the audio data is timestamped and forwarded to the second processing means which compares the received time-stamp to the local time. The transmission time periods of sending audio data packets from the first processing means to the second processing means are calculated based on the local system time and timestamp is inserted into the audio data packets. Subsequently, synchronised audio and video presentation or reproduction is performed.

7 Claims, 2 Drawing Sheets

U.S. PATENT DOCUMENTS

Figure 1:
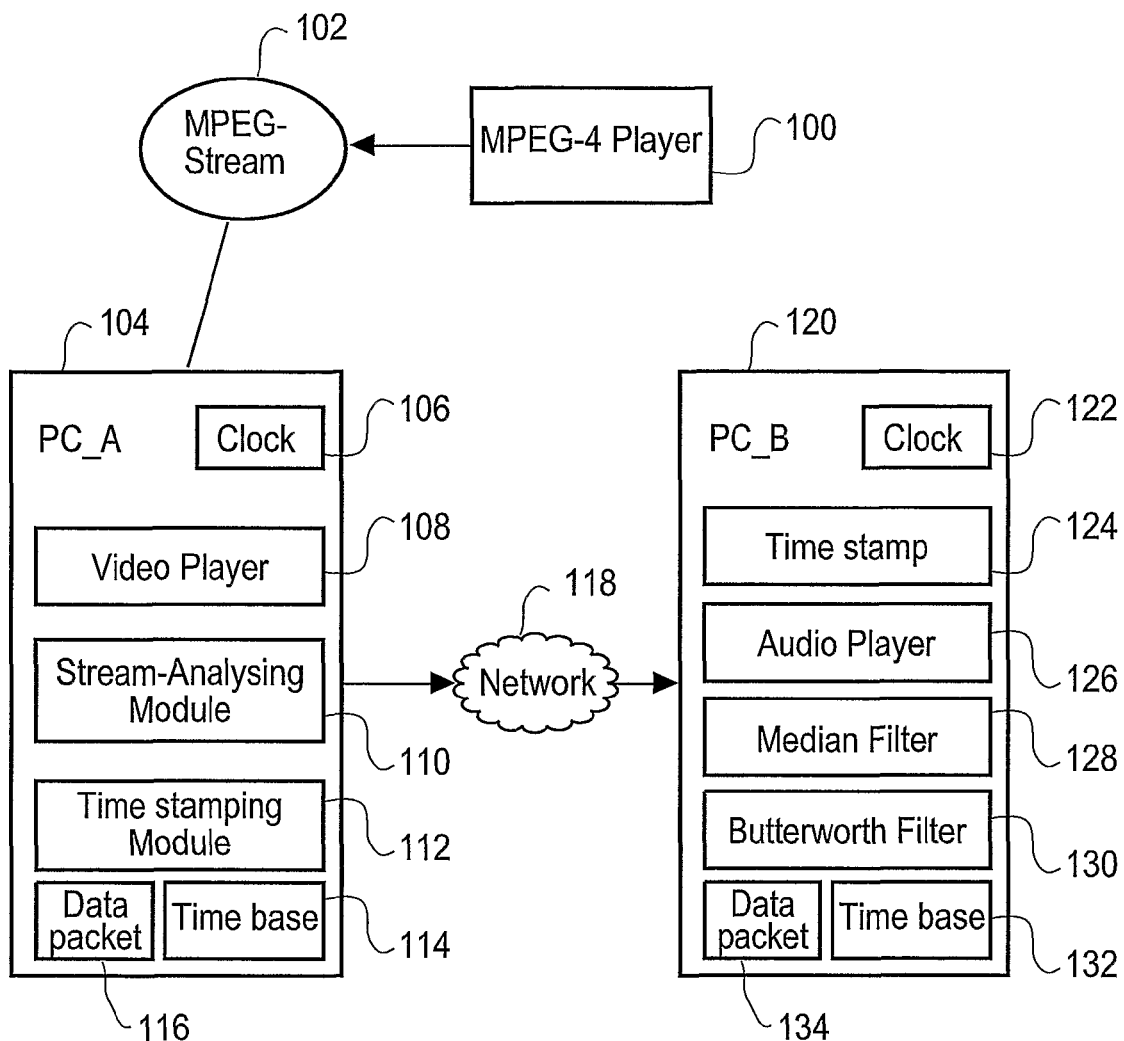

2007/0162952 A1* 7/2007 Steinborn et al. ............. 725/135
2008/0123724 A1* 5/2008 Yen et al. ..................... 375/220

FOREIGN PATENT DOCUMENTS

| EP | 1213630 | 6/2002 |
|---|---|---|
| JP | 10-093482 | 4/1998 |
| JP | 2003-018600 | 1/2003 |
| WO | WO 02/073851 | 9/2002 |
| WO | WO 03/047134 | 6/2003 |

OTHER PUBLICATIONS

Search Report Dated Feb. 9, 2005.

* cited by examiner

METHOD AND APPARATUS FOR PERFORMING SYNCHRONISED AUDIO AND VIDEO PRESENTATION

This application claims the benefit, under 35 U.S.C. §365 of International Application PCT/EP04/013243, filed Nov. 22, 2004, which was published in accordance with PCT Article 21(2) on Jul. 28, 2005 in English and which claims the benefit of European patent application No. 04090001.1, filed Jan. 6, 2004.

The invention relates to the synchronised presentation or reproduction of video and audio streams using non-synchronised processing means.

BACKGROUND

MPEG-4 is an international standard developed by the Motion Picture Experts Group (MPEG) which also developed a number of other MPEG-type standards for compressing audio and video data, for example MPEG-1 and MPEG-2. The encoded/compressed data is treated as object data and both, video and audio data, are combined into a single bitstream. Since an MPEG-4 system is configured to treat data as object data, it is easy to re-organise a received bitstream by separating it into multiple single packets of data. An MPEG-4 player allows then the audio and video data to be reproduced on a computer or an other device.

INVENTION

Even though the video encoding associated with the MPEG-type standard provides high resolution pictures, its use requires one or more powerful, dedicated processors, for example a digital signal processor, for encoding or decoding MPEG-type standard video data. The processing of an entire MPEG-type stream using only one computer consumes nearly all of the computational resources of the computer's general purpose CPU (central processing unit), thereby rendering the computer virtually useless for any other purpose. As a consequence, being able to use for MPEG-type technology a network of remote computers or devices and processing a video stream on one computer or device while sending the audio data to be processed on a second computer or device is highly desirable for MPEG-type data processing since it allows the utilisation of any standard computer or device for the video and audio processing.

Thus, it would be desirable to use two processing means or computers for rendering or presenting video and audio data, wherein video and audio streams need to be synchronised for presentation or reproduction.

A problem to be solved by the invention is to provide synchronised presentation or reproduction of video and audio using separate devices the operation of which is basically not synchronised with each other. This problem is solved by the method disclosed in claim 1. An apparatus that utilises this method is disclosed in claim 8.

Advantageous additional embodiments of the invention are disclosed in the respective dependent claims.

The inventive features described below are used for synchronising presentation or reproduction of audio data with the appropriate video data utilising two processing means or computers. A data stream comprising video and audio streams is received by first processing means, the received data stream is separated into video and audio streams and audio stream audio data packets are timestamped by the first processing means. Then, audio data packets are forwarded to second processing means, a local system time of the second processing means is determined and transmission time periods of audio data packets from the first processing means to the second processing means are calculated based on the local system time and the timestamp of the audio data packet. Subsequently, synchronised audio and video rendering/presentation based on the transmission time period is performed. Advantageously the process of rendering is accompanied by lowpass filtering the transmission time periods whereby a mean transmission time is obtained and used for synchronisation of video and audio presentation or reproduction. Also a median filter can be used for lowpass filtering the measured transmission time periods in order to the measurement result.

The present invention solves the above-mentioned problems of the prior art, and provides a method capable of fast response at start-up, as well as high stability during processing. The median filter is also very insusceptible with respect to large measuring errors.

An MPEG-type stream is separated into video data and audio data, wherein the video data is processed on the first device PC_A and the audio data is timestamped and forwarded to the second device PC_B which compares the received timestamp to the local time. The difference is considered to be the required transmission time. The internal time clocks of the first processing device and the second processing device are not synchronised.

The time reference for synchronisation of video and audio stream is obtained by subtracting mean transmission time periods from the local time of the second processing device PC_B. Subsequently, an additional lowpass filtering can be performed by a digital filter such as a Butterworth filter having a cut-off frequency below that of high frequency motion (jitter) which needs to be eliminated.

DRAWINGS

Figure 2:
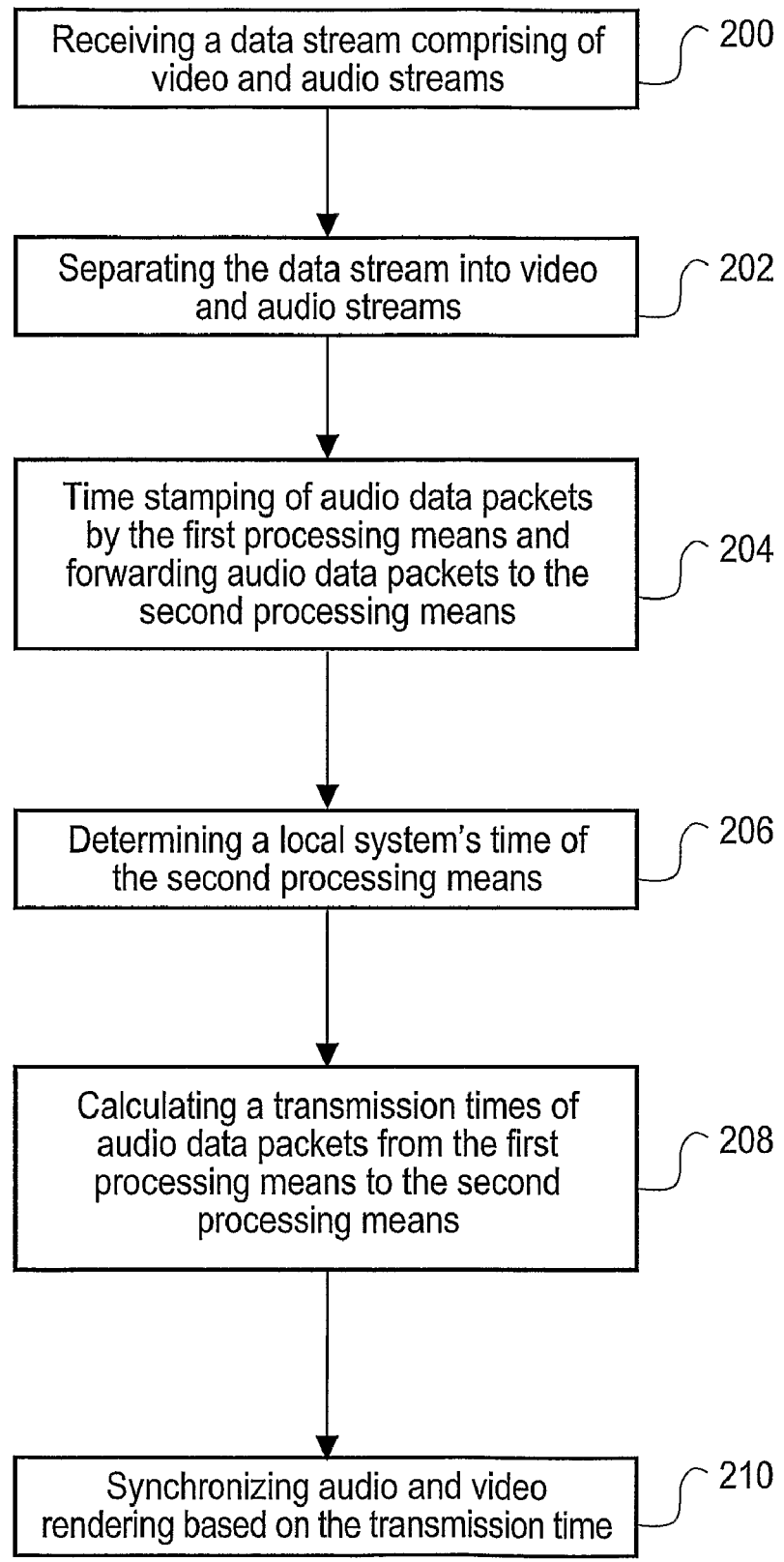

Exemplary embodiments of the invention are described with reference to the accompanying drawings, which show in:

FIG. 1 Block diagram illustrating a network of first and second processing means configured to perform audio and video presentation or reproduction;

FIG. 2 Flowchart of the inventive process.

EXEMPLARY EMBODIMENT

In the block diagram of FIG. 1 showing a general configuration of a multimedia computer network according to the invention, the reference numeral 100 denotes an MPEG-4 player which sends an MPEG-4 data stream 102 to first processing means PC_A 104 which include a video player 108. The received MPEG-type stream comprises a system, video and audio stream, which further contain video data packets 116 and audio data packets 134.

A stream analysing stage 110 examines the streams since the system stream also includes the structure and the configuration of the video and audio players. The first computer PC_A 104 processes video data obtained from the MPEG-4 video stream and displays it using e.g. an attached monitor. The timestamping stage 112 checks the local time clock 106 and inserts timestamps into audio data packets. A network 118, e.g. of type Ethernet (TCP/IP), connects the first processing means 104 with second processing means 120, e.g. a second computer PC_B, which processes the audio data packets received from the first computer PC_A, using audio player 126. The time base 114 of the first computer 104 and the time base 132 of the second computer 120 are not synchronised with each other and they have a tendency to drift away from each other. The second computer or the network or the first computer checks the local time clock 122 and compares the received timestamp 124 to the local time of time clock 122. The second computer or the network or the first computer calculates the corresponding transmission time periods.

A median filter 128 can be used for lowpass filtering of transmission time periods in order to obtain mean transmission which is in turn used for synchronisation of audio and video rendering. A Butterworth filter 130 provides additional lowpass filtering in order to improve the final result. MPEG-4 player 100 sends the MPEG-4 stream of data to the first processing means PC_A which processes video data and also forwards the actualised and timestamped audio data packets to the second computer PC_B through the network. After receiving audio data packets and also its configuration from the first computer, the second computer PC_B compares the received timestamp to the local time. The difference is considered to be the transmission time period.

The time base of the video processing computer 104 is not synchronised with the time base of the audio processing computer 120. Also, the internal time clocks of the first and the second computer are not synchronised and slowly drift from each other. Thus, the timestamps received by the second computer can be considered as being altered with respect to their value because the real transmission time cannot be specified exactly. This may have different reasons, for example: traffic on the network line or lines, configuration of TCP/IP and Ethernet, thread processing of the operating system, the varying amount of data, etc. In order to synchronise the presentation or reproduction of audio data with the appropriate video data the time difference between the sending of the packets and their receiving is calculated. This difference is then filtered with a median filter. A median filter is a time-discrete, non-linear filter which stores the acquired samples, sorts them and provides the middle sample (or the average of the two middle samples in case of even number of input values) as an output of its operation. The median filter used for the invention is very flexible with respect to the number of input samples it processes. Initially all samples values are set to zero. After having collected a pre-defined first number of samples, e.g. 19, the median filter starts outputting the mean transmission time, whereby the length of the median filter corresponds to said first number. As an option, upon receiving further input samples, the filter length used is increased by one per additional input sample received, up to a pre-defined maximum length, e.g. 499. Thereby both, a fast reaction time at start-up and a stable continuous operation can be achieved. Subsequently, an additional lowpass filtering can be performed by a digital filter such as a Butterworth filter having a cut-off frequency below that of high frequency motion (jitter) which needs to be eliminated. This kind of operation allows synchronising the video and audio presentation with respect to time and thus eliminating discontinuities in the time bases of the two computers.

In the step 200 in the flow chart of FIG. 2, an MPEG-type stream comprising video and audio streams is received by the first processing means PC_A. In the next step 202 the said MPEG-type data stream is separated into the video and the audio streams, wherein the first processing computer PC_A containing video player processes the video stream and the second processing computer PC_B containing the audio player processes the audio stream. Subsequently, in the step 204, the audio data packets are timestamped by the video processing computer PC_A and forwarded to the audio processing computer PC_B configured to receive audio data from the video processing computer PC_A. In the next step 206, the local system time of the audio processing computer is determined. Next, the audio stream transmission time periods from the first processing means to the second processing means are calculated in step 208. In the last step 210 synchronising of audio and video presentation or reproduction based on the calculated transmission time periods takes place.

Instead of synchronising presentation or reproduction of audio data with the appropriate video data, the presentation or reproduction of video data with the appropriate audio data can be performed. In such case video data packets of the video stream are timestamped by the first processing means and video data packets are forwarded to the second processing means configured to receive video data packets. Time periods are calculated for the transmission of the video data packets from the first processing means to the second processing means, based on the corresponding local system time and the timestamps of the video data packets. Time periods are calculated for the transmission of the video data packets from the first processing means to the second processing means, based on the corresponding local system time and the timestamps of the video data packets.

The invention claimed is:

1. Method for performing audio and video presentation or reproduction including the steps of:
   receiving a data stream including video and audio streams;
   separating said data stream into video and audio streams;
   timestamping audio data packets of said audio stream by first processing means and forwarding audio data packets to second processing means configured to receive audio data packets;
   determining a local system time of said second processing means;
   calculating time periods for the transmission of audio data packets from said first processing means to said second processing means, based on said local system time and said timestamps of the audio data packets wherein, when calculating said transmission time periods, the calculated transmission time periods are median filtered in order to obtain a mean transmission time period, and wherein the length of said median filtering is changed dynamically, starting with a pre-defined first number of input transmission time period values and increasing in conformity with the number of further received transmission time period values, up to a pre-defined maximum number of input transmission time period values;
   synchronising audio and video presentation or reproduction based on said calculated transmission time periods.

2. Method according to claim 1, wherein timestamping of the audio data packets by the first processing means is performed using an internal time clock of the first processing means.

3. Method according to claim 1, wherein the time reference of the audio presentation or reproduction is obtained by subtracting the transmission time period from the local time of the second processing means.

4. Method according to claim 1, wherein the calculation of a transmission time period is based on a plurality of audio data packets sent from the first processing means to the second processing means.

5. Method according to claim 1, wherein said mean transmission time period is used for synchronisation of audio and video presentation or reproduction.

6. Method according to claim 1, wherein the accumulated transmission time period values are sorted for said filtering.

7. System for performing audio and video presentation or reproduction including:
   means for receiving a data stream including video and audio streams;

means for separating said data stream into video and audio streams;

means for timestamping audio data packets of said audio stream by first processing means and forwarding audio data packets to second processing means configured to receive audio data packets;

means for determining a local system time of the second processing means;

means for calculating time periods for the transmission of audio data packets from the first processing means to the second processing means, based on the local system time and said timestamp of the audio data packets, wherein, when calculating said transmission time periods, the calculated transmission time periods are median filtered in order to obtain a mean transmission time period, and wherein the length of the median filter is changed dynamically, starting with a pre-defined first number of input transmission time period values and increasing in conformity with the number of further received transmission time period values, up to a pre-defined maximum number of input transmission time period values;

means for synchronising audio and video presentation or reproduction based on said calculated transmission time periods.

* * * * *